United States Patent [19]

Bradt

[11] Patent Number: 4,538,695
[45] Date of Patent: Sep. 3, 1985

[54] BATTERY DRIVEN GOLF CART

[76] Inventor: Grodon E. Bradt, Kinetico Center, Busch, Ark. 72620

[21] Appl. No.: 620,559

[22] Filed: Jun. 14, 1984

[51] Int. Cl.³ .................... B62D 51/02; B62D 61/08
[52] U.S. Cl. .................... 180/19.2; 180/19.3; 180/216; 180/333; 280/DIG. 5
[58] Field of Search .............. 180/19.2, 19.3, 65.1, 180/65.6, 216, 333; 280/62, DIG. 5

[56] References Cited

U.S. PATENT DOCUMENTS

| | | |
|---|---|---|
| 3,330,371 | 7/1967 | Seaman . |
| 3,369,629 | 2/1968 | Weiss . |
| 3,608,659 | 9/1971 | Gardner ...................... 280/DIG. 5 |
| 3,635,301 | 1/1972 | Tuson . |
| 3,648,795 | 3/1972 | Moulton ............................. 180/216 |
| 3,888,324 | 6/1975 | Kossow ........................ 280/DIG. 5 |
| 4,042,055 | 8/1977 | Ward ............................. 180/65.1 X |
| 4,354,569 | 10/1982 | Eichholz ......................... 180/333 X |

Primary Examiner—Robert G. Nilson
Attorney, Agent, or Firm—McWilliams, Mann, Zummer & Sweeney

[57] ABSTRACT

A self propelled two speed vehicle suitable for use as a golf cart, in which the frame is arranged to carry one or two golfers and/or their golf clubs over short distances such as are encountered in golf course use. The cart is provided with a low level flat rearwardly directed riding platform applied between the two rear wheels of the vehicle which enables one or two persons to ride the scooter by standing on the platform, in side by side relation where two persons are to ride the vehicle, with the vehicle frame and platform being arranged for ease of mounting and dismounting same by stepping up or stepping down from the rear of the vehicle. The vehicle has a single foot actuated control lever for actuating or stopping the vehicle, and a steering wheel for steering the vehicle front wheel, which control lever and steering wheel are centered so that a rider standing in either the right or left side positions on the riding platform can operate the scooter vehicle. The vehicle is arranged so that instead of being ridden in the manner indicated, the vehicle can be actuated and led by a pedestrian vehicle user who also acts as the vehicle operator by grasping an auxiliary control arm in the nature of a draw bar that in its normally inoperated position projects upright from the front of the vehicle, it being spring biased in this position, and with the walking user grasping same and drawing it forwardly of the vehicle to a near horizontal position.

15 Claims, 14 Drawing Figures

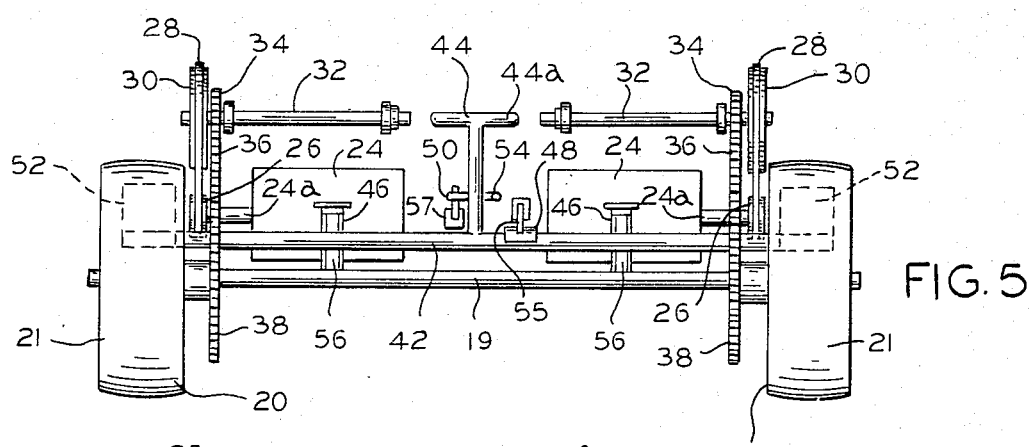
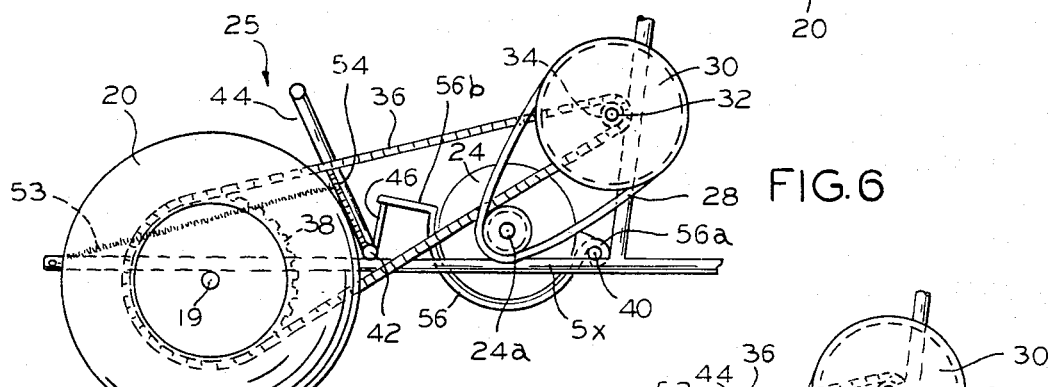
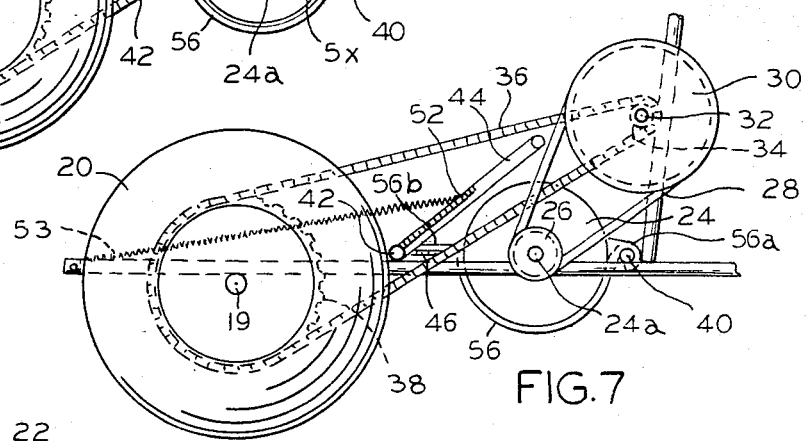
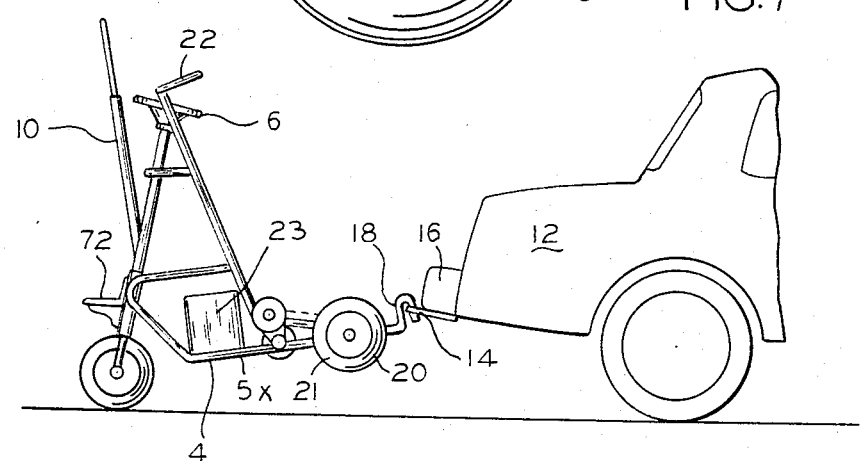

BATTERY DRIVEN GOLF CART

This invention relates to a self propelled battery driven vehicle in the nature of a golf cart that is adapted to convey one or two golfers and/or their golf clubs over short distances in playing golf, and more particularly, to a light weight and inexpensive, three wheel vehicle that is self propelled with multi speed availability, and that provides the advantages of both a simple light weight unmotorized golf bag cart for carrying golf bags across a golf course, and the more complex and expensive self propelled passenger golf cart that provides transportation for one or several golfers over the golf course between points of play on the golf course.

BACKGROUND OF THE INVENTION

Many people who like to play golf would prefer to walk at least part of the way during a round of golf for exercise, but they find that if they walk all the way around the nine or eighteen holes that they play, it is often too fatiguing, and can adversely affect their game. If the golf player uses one of the conventional motorized golf carts to ride in across the golf course, so as the player can ride between points of play on the course, payment of rental is normally required, and the cart in the nature of things must be driven all the way around the course to return it to where it was picked up. On the other hand, if the golfer chooses to walk around the course, either carrying his bag himself or applying it to one of the numerous available forms of bag tote carts whether of the common unmotorized pull type, or of a more expensive power driven type, the golfer must also walk all the way around the course since it is only the golfer's club bag that is on a wheeled conveyance and the conveyance involved is not in any way adapted for riding by the player.

A principal object of the present invention is to provide a self propelled multi-speed cart in the nature of a low level, low profile, battery driven type vehicle, especially suited for golf course use, that not only carries the golf bags of one or two golfers playing together, but also is arranged to serve as a conveyance for moving one or two golfer's, playing together, in standing relation on the vehicle between positions of golf play, or optionally, where the golfers want to walk between positions of golf play, one of the golfers can trail the cart behind him in walking toward the next point of play in a manner similar to the use of unmotorized bag tote carts, with the cart having a forwardly extendable auxiliary control arm that may be grasped by the golfer walking in front of same for controlling the driving action of the vehicle that he is leading.

Another principal object of the present invention is to provide a battery driven golf cart type vehicle which can easily be mounted and safely ridden in a standing position by one or two golfers playing together, with one of the golfers driving the vehicle using a foot actuated control lever for starting, driving, and stopping same, and a hand wheel for steering the vehicle, and with the second player, when present on the vehicle, merely riding alongside the player that drives the vehicle.

Still a further principal object of the present invention is to provide a self propelled golf cart vehicle of the battery driven type in which the vehicle has a low level passenger standing platform and bracing hand holds arranged for ease of mounting and dismounting the vehicle from the rear of same and safe riding on the vehicle, that is adapted to accommodate up to two riders standing side by side on the vehicle, and that accommodates full control of the vehicle movement by a single rider or one of two riders where a second rider is present.

Another major object of the present invention is to provide a simple low cost vehicle drive arrangement for a self propelled golf cart type vehicle which permits ease of control and operation of the vehicle when the golfer is to be carried by same, in addition to his bag, and which also accommodates walking by the golfer ahead of the vehicle, with the golfer leading the vehicle in a manner similar to a manual pull type golf bag tote cart, and with the vehicle controlled so that it drives to automatically keep pace behind the pedestrian golfer leading same when moving to the next position of golf play, and without requiring the golfer's attention for this purpose.

Another important object of the present invention is to provide a simple, low level, golf cart drive and control system for golf cart type vehicles adapted to carry one or two golfers in a standing side by side relation thereon, that is arranged to allow either a single such rider, or one of either of the two riders, to operate the vehicle from either riding position on the right or left hand side of the vehicle.

Another important object of the invention is to provide a simple low cost reliable and low profile drive and control arrangement for golf carts and similar vehicles that utilizes a minimum of inexpensively available mechanical and electrical components for effecting full control of the vehicle movements.

Still other objects of the present invention are to provide a self propelled golf cart arrangement that accommodates connection of the vehicle to the golfer's automobile, trailer fashion, for trailing of the cart behind the golfer's automobile to transport same between point of storage and point of use, or vice versa, as, for instance, between the golfer's home and the golfer's golf course, or alternately to provide a golf cart transporting arrangement that accommodates the mounting of the cart on the rear of the automobile completely off the ground for being fully carried by the automobile.

Other objects, uses and advantages will be obvious or become apparent from a consideration of the following detailed description and the application drawings in which like reference numerals indicate like parts throughout the several views.

In the drawings:

FIG. 1 is a small scale elevational view of the left hand side of a self propelled golf cart type vehicle arranged in accordance with the present invention, as it would be used by one or more persons playing golf, showing, for convenience of illustration one golfer in each of the two possible but alternate golf cart operating locations provided by the vehicle involved, with the golfer shown riding the vehicle, positioned to also drive the vehicle, and with the golfer shown as a pedestrian leading the vehicle by his hand grasping the cart auxiliary control arm or tetherboom, the later having the two position relation that is illustrated, including the upright and inoperative position that the auxiliary arm control is in when the cart is being driven by a riding golfer, and the auxiliary arm forwardly extending position when a pedestrian golfer uses the vehicle by walking in front of same and controls the actuation of the vehicle by hand grasping of the auxiliary control arm which is moved to a substantially horizontal vehicle tethering position for this purpose;

FIG. 2. is a perspective view of the vehicle, taken from the upper rear right hand side of same, as the vehicle is shown in FIG. 1, but on an enlarged scale, and with the golfing persons omitted, and the vehicle drive control lever control positioned for parking or non-driving of the vehicle;

FIG. 5 is a diagrammatic elevational view of the vehicle drive train and one piece drive actuation and vehicle braking control bar involved in the drive of the cart, taken from the rear of the cart;

FIG. 6 is a fragmental elevational view of the vehicle drive train, taken from the right side of the vehicle, showing the drive train in its "stop" mode;

FIG. 7 is a view similar to that of FIG. 6, but showing the drive train in its "go" mode;

FIG. 8 is a diagrammatic side elevational view, on a smaller scale, of the cart of the present invention disposed at the rear end of an automobile, indicating the manner of coupling the cart to the automobile for towing of the cart on the highway, as would be involved in moving the cart to or from a golf course or the like;

Figure 1:
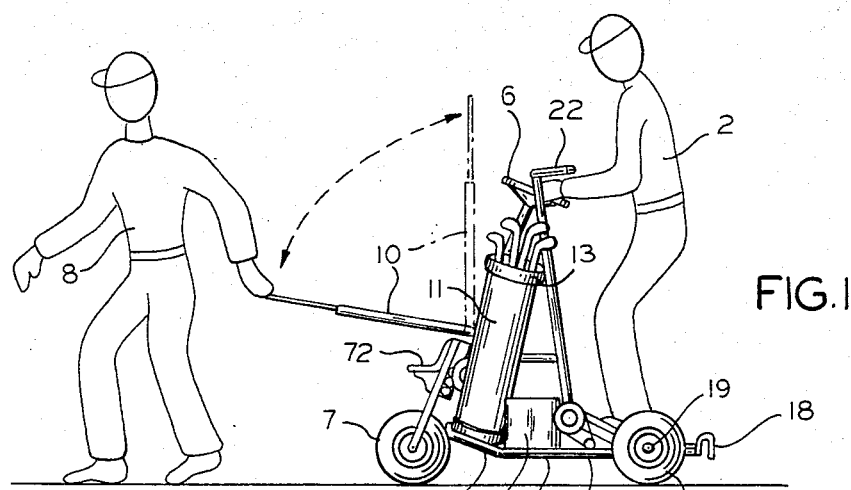

However, it is to be distinctly understood that the drawing illustrations provided are supplied primarily to comply with the requirements of the Patent Laws, and that those skilled in the art will be able to make modifications and variations therein that are intended to be covered by the appended claims.

GENERAL DESCRIPTION

In accordance with the present invention, a self propelled dual driving speed mode, cart type vehicle 4 of low cost light weight characteristics is provided for carrying in a standing position one or two persons and/or a light cargo, which vehicle 4, while it can be for general purpose use, is especially adapted for use as a golf cart and in connection with playing golf.

The vehicle 4 comprises a tubular frame 5 supporting a steering wheel 7 (bearing tire 7c) in front of the frame 5, a steering hand wheel 6 being provided to steer the vehicle 4, and frame 5 having a pair of driven rear wheels 20 (each bearing a tire 21) adjacent the rear of the vehicle adapted to rotate, when driven, about a common axis defined by rear axle 19 extending transversely of the vehicle, with the front wheel 7 and the rear wheels 20 thus being oriented tricycle fashion. The driven wheels 20 are driven by a low profile drive arrangement or system 25 that is oriented to be largely in the plane of the front and rear wheels 7 and 20, whereby the vehicle frame 5 may support, in any suitable manner, a low level and flat passenger platform 41 of any suitable construction, proportioned to extend laterally of the vehicle between its rear wheels 20, and forwardly and rearwardly of the vehicle so as to provide defined standing positions for two persons standing in side by side relation on the top of the platform 41, as shown most clearly in FIGS. 1 and 2. It is to be noted that between the rear wheels 20 and at the rear end of same, the platform is at a level intermediate the levels of the tops and undersides of wheels 20 (including their tires 21).

As has been indicated, a basic concept of the invention is that the self propelled vehicle 4 be arranged to accommodate one or two persons as standing riders on the vehicle, when the vehicle 4 is driven. The particular vehicle 4 disclosed is especially adapted for use, as indicated, in connection with the playing of golf; when one or several golfers engage in this game, it is common practice for the golfer to first drive the ball down the fairway toward the hole to be played out, and then walk or ride to the spot where his ball has dropped and stopped motion, and again hit the ball toward the next hole, using the appropriate club, depending on the distance involved. This is repeated until the golfer holes out the ball at hole he is shooting to complete, whereupon he starts again the same procedure in playing towards the next hole of the golf course.

The self propelled cart 4, in accordance with the invention, is arranged to dispose the platform 41 at the indicated low level so that platform 41 can be mounted from the rear of the vehicle by the golfer, or his companion, or both so that either or both stand on the vehicle 4 at the position indicated by reference numeral 2 of FIG. 1; the person there illustrated is shown positioned to drive the cart using steering hand wheel 6 and the single foot control lever 44, as described hereinafter. The person indicated by reference numeral 2 who drives the vehicle 4 may be on either side of the platform 41, and he may be by himself or accompanied by another golfer standing next to him om the other side of the platform 41 and who holds on to the handle portion 22 of the cross bar 21 of frame 5. The golfer acting as the driver grasps the vehicle steering hand wheel 6, which is suitably journalled on the frame 5 where indicated by reference numeral 9 and is suitably connected in steering control relation to the turning wheel 7, for the purpose of steering the vehicle 4. To actuate the vehicle 4, the driver uses one foot to appropriately move the foot control lever 44 (having cross handle 44a) from the rearward position of FIG. 6 toward the position of FIG. 7. As will be made hereinafter clear, the foot control lever 44 has positions for stop (the position of FIG. 6), neutral, low speed, and high speed (the position of FIG. 7), with brake control being provided for (the position of FIG. 6).

Figures 2, 3, 4:
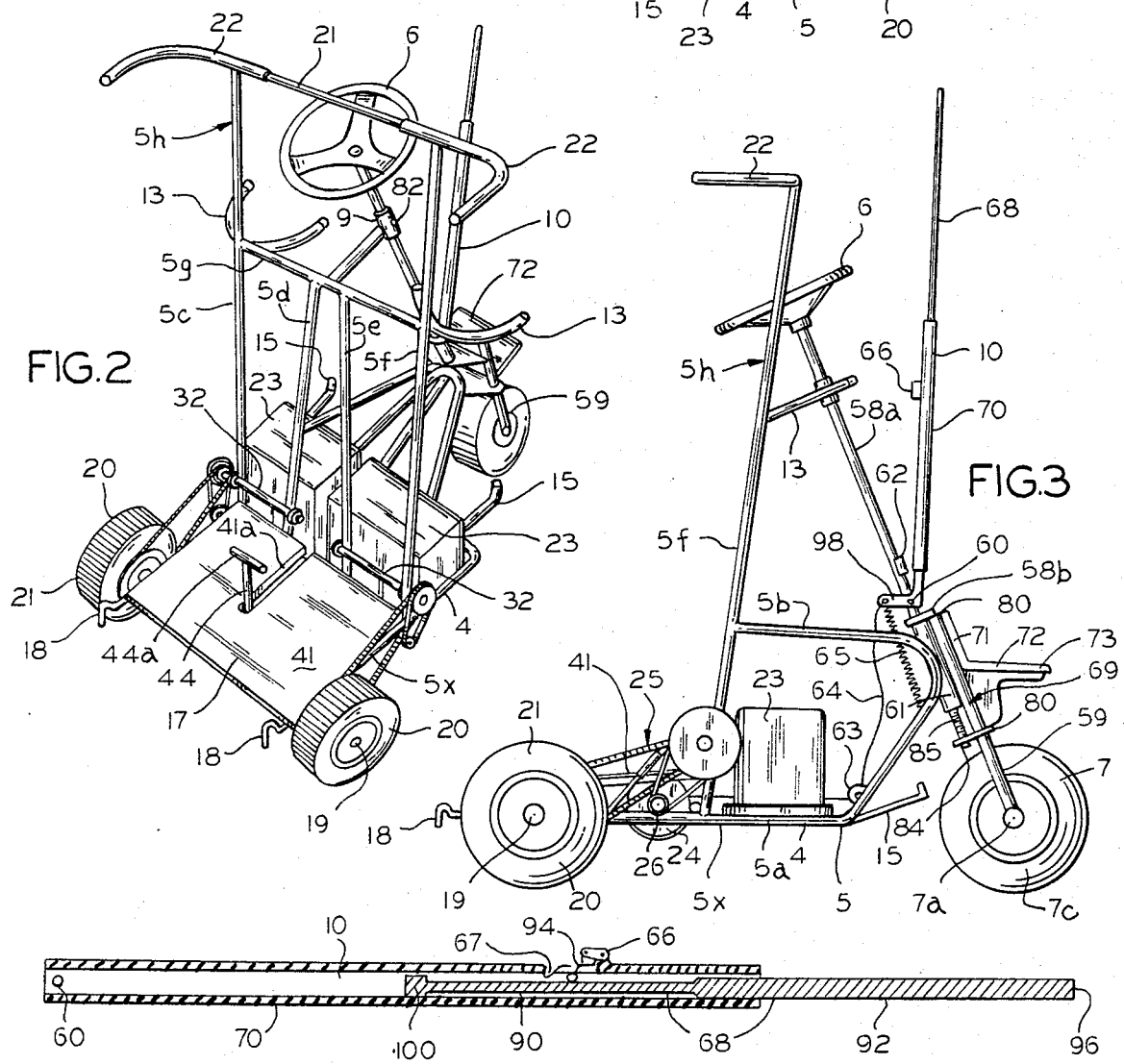
FIG. 3 is an elevational view of the vehicle of the invention, showing the right side of same, and the vehicle drive lever control positioned for driving the vehicle full speed and with the vehicle auxiliary control arm in its inoperative position.
FIG. 4 is a diagrammatic and longitudinal cross-sectional view through the vehicle's forward movement controlling auxiliary control arm or tetherboom, diagrammatically illustrating features of the invention there involved.

The vehicle frame 5 is suitably formed from tubing formed from a suitable metal or plastic, and the tubing components involved are shaped and fixed together so that the frame 5 defines floor section 5a, that suitably journal, drive wheels 20, forwardly extending section 5b that mounts frame steering wheel 7, and an upright hand hold section 5h that projects from the floor section 5a in front of platform 41 and that includes cross bar 21 at the upper end of same which has hand hold portions 22 adjacent the respective ends of same that are defined by plastic tubing or the like and are at an elevation above platform 41 for convenience hand grasping by a rider standing at one of the two riding positions of the platform 41 that are indicated by FIG. 2. Hand hold section 5h also defines bracing upright portions 5c, 5d, 5e and 5f and cross bracing portion 5g suitably mounted and arranged for bracing cross bar 21.

It will be noted that the vehicle 4 defines a longitudinally extending midportion 17 with which the steering wheel 7, hand wheel 6 and control lever 44 are aligned or centered on, which such vehicle midportion 17 bisecting the spacing between drive wheels 20, and forming platform 41 into the indicated right and left rider standing positions for carrying one or two golfers in side-by-side relation. Control lever 44 operates in slot 41A, formed in platform 41, that is aligned with vehicle midportion 17.

It is to be noted that the cross bar 21 of frame 5 extends outwardly of the vehicle to both sides of the vehicle, and that, as indicated, the vehicle steering wheel 6 and vehicle drive control lever 44 are aligned with the longitudinal center line of the vehicle so that the driving and passenger positions or stations on the platform 41 are interchangeable between either the left or the right side of the vehicle, and while the vehicle 4 is arranged to accommodate two standing passengers on a platform 41, one of whom drives the vehicle, the driver may also be the only passenger standing on the vehicle for transportation thereby.

The vehicle steering wheel 7 is suitably journalled, for rotation about axis 7a, and between spaced elongate members 59 that are affixed to frame structure 69 which includes upper and lower plates 80 fixed thereto that are slidably received over pivot shaft or axle 84 that is suitably mounted in journal tube 61 that is fixed as by welding to frame section 5b at the converged front portions or same (see FIG. 2). Steering post 58a is aligned with and shiftably receives the upper end of shaft or axle 84, and has fixed to its lower end a flange 58b that is suitably fixed to upper plate 80 in torque transmitting, centered relation, to same for turning of wheel 7 through post 58a and frame structure 69. Compression spring 85 is received over shaft or axle 84 and between the lower end of tube 61 and the lower plate 80 for resiliently cushioning wheel 7 (including its tire 7c), with the frame structure 69, plates 58b, and 80, and the steering post 58a (through journalling-device 9) deflecting longitudinally of post 58a when spring 85 is deflected. Steering post 58a is pivoted about its longitudinal axis by suitably turning the steering hand wheel 6 (that is suitably fixed or keyed thereto) to turn post 58a within and about its journalling device 9 that is suitably supported by frame section 5h (see FIG. 2), to pivot frame structure 69 as needed to steer the vehicle 4 as vehicle 4 moves along the ground under the driving action of the vehicle that is about to be described. Journal tube 61 is fixed to frame section 5b for support of the front wheel assembly involved.

It is a feature of the present invention that the self propelled vehicle 4 is characterized by the low profile rear wheel drive system 25 that is illustrated which is of also low cost and simplified characteristics. The drive system 25 for vehicle 4 comprises a pair of conventional series wound electric motors 24, of which pair of motors, since both motors each have a series winding, provide a differential drive between the rear wheels 20 (which are suitably tired as indicated). As indicated hereinafter, the motors 24 preferably take the form of standard automotive starter motors which are series wound and are ideally suited to operate the vehicle 4 in view of the vehicle's relative low torque, intermittent driven, duty requirements. Such starter motors are represented by the well known Ford long shaft motors used on Ford automobiles from about 1952 to about 1970. These starter motors can be purchased new, and are also widely available in used condition from surplus automotive spare parts yards at minimum cost; such used motors can readily be restored to like new condition through very inexpensive bearing and brush replacement to serve as motors 24, and where the motors 24 are obtained from this type of source, the cost savings factor of using such recycled starter motors as motors 24 will be on the order of 1/7th to 1/10th the cost of comparable new motors of the same type.

As disclosed in FIGS. 5-7, each motor 24 comprises its own shaft 24a which is suitably keyed to a small diameter driving pulley 26 that is received in trained relationship with endless belt 28 that may be in the nature of the conventional V-belt, which belt 28 is suitably trained over a large diameter pulley 30, that is suitably keyed to cross or jack shaft 32 that is in turn suitably journalled on frame 5; on either side of the vehicle 4, the respective shafts 32 (which are not connected) are suitably keyed to a small diameter chain sprocket 34 over which is trained a drive chain 36 that is similarly trained over a large diameter sprocket 38 that is suitably keyed to the hub of the wheel 20 which it drives (see FIG. 5). As indicated by the showings of FIGS. 2-7, each motor 24, the wheel 20 driven by same, and the driving mechanism transmitting the drive to the wheel involved, on one side of the vehicle 4, is a mirror image of the same equipment on the other side of the vehicle, with each wheel 20 being driven by its own motor 24. As indicated in FIG. 2, jack shafts 32 are separate right and left shafts; they are respectively suitably and separately journalled on the frame members 5c, 5d, 5e, and 5f, of frame 5, in the aligned positions indicated. The wheels 20 are separately and suitably journalled on rear axle 19.

It is to be understood that the left motor 24, assuming it is in the form of the suggested automotive starter motor, has to be modified so that it runs backwards of its normal operating direction. For this purpose the motor brush locations must be reoriented ninety degrees in relation to the motor field coils; this is accomplished by drilling new holes in the brush end caps so that they can be repositioned ninety degrees from their standard positions when in starter motor relation (as will be apparent to these skilled in the electric motor arts).

In addition to arranging the vehicle 4 so that its drive system is devised to match the torque and operating characteristics of standard automotive starter motors, the invention provides a unique combination of mechanical and electrical devices at a minimum cost and simplicity. No rheostats or phase-pulsing controls are required. The motors 24 are preferably actuated at just two current levels, namely six volts and twelve volts, and corresponding torque and speed levels, with the twelve volt supply being for full torque and maximum speed of the motors 24. This is accomplished in the illustrated embodiment by electrically connecting the motors 24 to be switched between series and parallel connections in two possible arrangements illustrated in FIGS. 10 and 11. In the illustration of FIG. 11, the motors 24 are switched between series and parallel connections with a single twelve volt battery 23 that serves as the vehicle driving energy source. Alternately the vehicle drive arrangement may be that illustrated in FIG. 10 wherein a pair of six volt batteries 23a serve as the driving energy source. In the arrangement diagramatically illustrated in FIG. 10, the two six volt batteries 23a and the motors 24 are switched between parallel and series connection to alternately provide the six volt and twelve volt electrical energy supply to the motors 24 that is contemplated by the present invention, as described hereinafter. Batteries 23 and 23a may be of the standard storage battery type commonly used in automotive cars and trucks.

An important feature of the present invention is that the motors 24 are mounted and operated so as to provide a smooth transition, when operating the vehicle 4, from the vehicle stopped relation to the vehicle low speed forward drive relation. As best illustrated in FIGS. 5, 6 and 7, the motors 24 are disposed in side by side relation transversely of the vehicle 4, and each are suitably pivoted to the frame 5 to swing about a common axis 40 (see FIGS. 6 and 7) that extends transversely of the vehicle and is defined by suitable pivot pins suitably mounted on frame 5. Each motor 24 is supported by its own saddle 56, one end 56a of which is suitably connected to the pivot pin defining the axis 40 and the other end 56b of which is suitably connected to the projecting end of a lever 46 that has its other end suitably fixed to the transversely extending one piece actuator cross bar 42 that is suitably journaled in the frame 5, to which the foot control lever 44 is suitably fixed at the middle of the vehicle in the illustrated embodiment (see FIG. 5). Thus, when the control lever 44 is in the rearward position of FIG. 6, the levers 46 are positioned by actuator bar 42 to raise the respective motors 24 whereby the pulleys or sheaves 26 are sufficiently moved toward pulleys or sheaves 30 to slacken the tension of the belts 28 sufficiently so that the pulleys or sheaves 26 are free of driving relation to the respective belts 28, and thus would slip with respect to same (when motors 24 are driven to provide a declutching action), with the result that the driving energy provided by the motors 24 (that is energized by one of the battery arrangements shown in FIGS. 10 and 11) would not be transmitted to the vehicle rear wheels 20 so that the vehicle would remain stationary. However, the position of FIG. 6 is the "stop" position, and the motors 24 are not energized until lever 44 has been moved fowardly enough to actuate low speed switch 55, as discussed hereinafter, when the control lever 44 is positioned as indicated in FIG. 6. Movement of the foot control lever 44 from the position of FIG. 6 toward the position of FIG. 7 moves the levers 46 so as to lower the respective saddles 56 and thus the respective motors 24 such that the full weight of the respective motors 24 and the sheaves or pulleys 26 they drive is supported by the respective belts 28 whereby the respective pulleys or sheaves 26 are in driving relation with the respective belts 28 (and are thus reclutched) so that the drive when provided by motors 24 is transmitted to the vehicle rear wheels 20. Positions of the control lever 44 between the position shown in FIG. 6 and approximately upright position, when the motors 24 are running, in effect provide the neutral "on" but nondriving relation of the vehicle with the motors running, and then gradual start up of the vehicle rear wheels in turning to move the vehicle forwardly, from zero speed to the low speed level, as the lever 44 moves forwardly of its position of FIG. 6 to a more or less vertical position.

Figure 12:
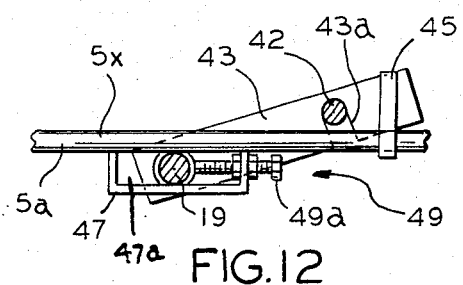
FIG. 12 is a fragmental elevational view, partially in section, illustrating the journalling arrangement for the vehicle rear axle and the drive actuator bar.

A suitable manner of securing rear axle 19 to frame floor section 5a is shown in FIG. 12. Frame floor section 5a includes on either side of same floor rods or tubes 5X, that extend longitudinally of frame 5, each of which has fixed to the underside of same retainer 47 that defines a rectilinear slot 47a through which the axle 19 extends. At each slot 47a a screw and nut type adjusting device 49 is applied to the retainer 47, including screw 49a bearing against axle 19 and seated against axle 19, and is operable and adjustable to properly tension the respective chains 36 by shafting axle 19 as needed. The rear axle 19 also swingably mounts adjacent each floor rod 5X a journal plate 43 that is notched as at 43a to be received over and contain actuating bar 42 that is applied crosswise of floor rods 5X, for pivoting bar 42 on frame 5; a closed loop type clamp element 45 received over the journal plate 43 and its adjacent floor rod 5X is frictionally forced into clamping relation with the plate 43 and rod 5X received thereby to both journal actuator bar 42 in place and hold axle 10 and bar 42 in the desired constant spacing, when axle 19 is to be moved for chain adjustment to provide that brake pads 52 will be in proper operating relationship with the tires 21 of the respective wheels 20.

It is a feature of the invention that the one piece pivotally mounted drive actuator bar 42, by its actuation by way of control lever 44, achieves all actuation and interlock coordination of the drive system of vehicle 4. In addition to the control lever 44 and the saddle controlling levers 46, at each end of the actuator bar 42 is mounted a brake pad 52, which pads 52 are suitably arranged for braking engagement with the tires 21 of the respective wheels 20, when the control lever 44 is in its retracted position of FIG. 6, which is the stop mode of the vehicle 4. It is preferable that the actuator bar 42 be suitably spring biased counterclockwise of the showings of FIGS. 6 and 7 so that the brake pads 52 are spring biased against the tires of the respective wheels 20 in the stop mode of the vehicle, whereby the vehicle brake pads 52 are lightly applied for appropriate braking action on the vehicle when the vehicle is unattended. Should it be desirable to brake the vehicle 4 when it is under way and carrying standing passengers as indicated in FIG. 1, the person who is acting as the vehicle operator 2 applies the vehicle brakes represented by the pads 52 by moving the control lever 44 with one foot rearwardly of the vehicle to bring the brake pads 52 into rubbing engagement with the tires of wheels 20 for braking of the vehicle as needed. Otherwise, the operator-vehicle rider with one of his feet keeps the foot ccntrol lever 44 in a forward position for keeping the vehicle under way across the golf course, at the low or high level speed referred to hereinafter. The spring biasing of bar 42 may be effected by applying suitable tension spring 53 between the stud 54 of control lever and the rear end of frame floor section 5A (below platform 41), as suggested in FIGS. 6 and 7.

Figures 13, 14:
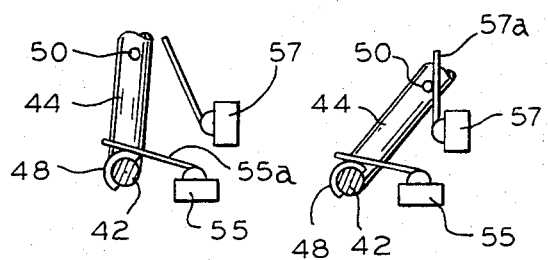
FIGS. 13 and 14 are fragmental views, partially in section, and diagrammatically illustrating the manner in which the vehicle foot control lever actuates the vehicle low and high speed switches.
Figure 10:
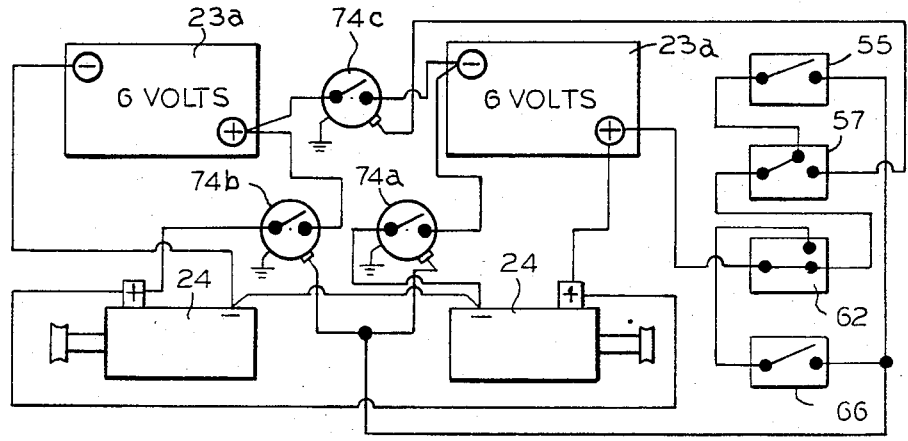
FIG. 10 is a diagrammatic view illustrating a circuit diagram for a two six volt battery actuation arrangement for driving the cart of this invention, with the parts illustrated being shown largely in block diagram form.
Figure 11:
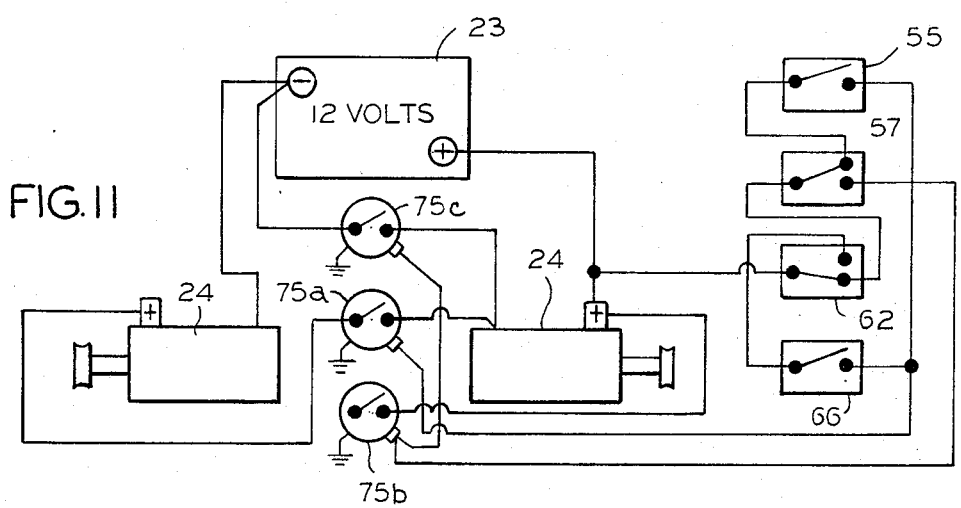
FIG. 11 is a view similar to that of FIG. 10, but showing an alternate arrangement in which a single twelve volt battery energizing arrangement is involved for driving the cart.

In the preferred drive arrangement of the vehicle 4, to actuate the vehicle 4 from its stopped relation, the foot control lever 44 is moved forwardly from its rearmost vehicle stopped relation position, whereby the brake pads 52 are freed from engagement with the tires 21 of the respective rear wheels 20, and a cam surface 48 (see FIGS. 5 and 13) on the actuator bar 42 becomes disposed to actuate the switch arm 55a of suitable low speed switch 55 that serves the purpose illustrated in the alternate wiring relations of FIGS. 10 and 11 to power the motors 24 at the six volt low speed driving energy level at the same time the actuator bar 42 moves the levers 46 to correspondingly lower the motor support saddles 56, with further forward movement of the 17. lever 44 further dropping the respective motors 24 until the pulleys or sheaves 26 they drive are in clutching relation and engage the respective drive belts 28 with the full weight of the motors and pulleys or sheaves 26 they support; this places the pulleys or sheaves 26 into full slip free driving relation with respect to belts 28, whereby the vehicle rear wheels 20 are driven at the indicated low speed rate to make now fully effective the drive transmitting connection between the motors 24 and the respective wheels 20. Should the higher speed driving rate be desired, the foot control lever 44 is pushed further forwardly to the extent that the lever 44 by reason of the arm 50 it carries (see FIG. 5) actuates the switch arm 57a of high speed switch 57 (see FIG. 14); switch 57 preferably takes the form of a single pole, double throw switch that has a normally "on" pole in series with the low speed switch 55 whereby when the high speed switch 57 is activated, it turns off the six volt power source and turns on the twelve volt power source, using one of the switching arrangements indicated in FIGS. 10 and 11 depending on the circuitry employed.

A further characteristic of the invention is that the vehicle 4 in being arranged to accommodate the use of standard automobile starter motors, also accommodates the use of standard automotive starter solenoid switches to handle the high current switching involved. Such solenoid switches are represented by the solenoid switches used in connection with Ford long shaft starter motors of the type previously referred to, and comprise single pole single throw relays that are capable of handling the amperage load involved. By employing the unique circuitry shown in FIGS. 10 and 11, respectively, only three solenoid switches of this type need be employed to serve the functions of a new single, double throw, double pole, center off, high current relays that normally would be required for such arrangements. The preferred solenoid switches, which as indicated are of the standard automotive starter type, do not normally wear out during the typical life of automobiles in which they are installed and are therefore widely available at automobile part surplus stores; such devices do not require rebuilding when used in this manner. By using solenoid switches of the type indicated in place of new high current double throw double pole center off relays, a cost reduction is possible on the order of ½ to 1/7th in price comparison.

In this connection, FIG. 10 shows the circuitry version of employing two six volt batteries 23a for driving the indicated motors 24 so as to actuate their pulleys or sheaves 26 by electrically connecting the switch 55 to actuate solenoid switches 74a and 74b so as to close the switches involved; the motors 24 that are run at the lower six volt level in parallel connection with the batteries 23a. On actuation of high speed switch 57, the electrical connections involved are such that the solenoid operated switchs 74a and 74b are opened, and the solenoid operated switch 74c is closed, to connect the batteries 23a in series for supplying the full speed twelve volts to the respective motors 24 for driving same at full torque and speed characteristics.

In the arrangement shown in FIG. 11, where the single battery 23 is a twelve volt battery, when the low speed switch 55 closes the solenoid operated switch 75a, with the solenoid operated switches 75b and 75c remaining open, the motors 24 are then connected in series, with each being powered by an approximate six volt electrical energy supply. On activation of the high speed switch 57, the electrical arrangement is such that solenoid actuated switch 75a is opened and solenoid actuated switches 75b and 75c are closed, resulting in the motors 24 being connected in parallel with the single battery 23 with the result that the motors 24 are supplied with driving energy at the full speed twelve volt level, for full torque and speed characteristics. The arrangement of FIG. 11 is preferred as it offers the flexibility of using a single twelve volt battery (as illustrated), or two six volt batteries connected in series to provide the twelve volt EMF, or two twelve volt batteries connected in parallel to provide the twelve volt EMF.

The invention contemplates that for employing either the circuit arrangement shown in FIG. 10 or the circuit arrangement shown in FIG. 11, the motor 24 at the right hand side of the vehicle be insulated from the vehicle's grounding system in a suitable manner. As motors 24 preferably take the form of standard automotive starter motors, the negative side of the motor is not electrically isolated from the motor housing. As in automotive practice cart frame 5 is negative grounded for wiring simplification, and as the vehicle left hand motor 24 is preferably connected to negative ground, the vehicle right hand motor is suitably electrically isolated or insulated from ground.

As indicated, the drive arrangement of the vehicle 4 is of low level orientation and configuration relative to the ground, which accommodates the low level positioning of the riding platform 41 of the vehicle, which is generally flat or planar in configuration and extends across between the vehicle rear wheels 20 and well below the upper level of the tires of such wheels 20 (see FIGS. 2 and 3). In the form illustrated, the riding platform 41 is slanted downwardly rearwardly of the vehicle, this permitting the platform 41 adjacent its forward end to accommodate the positioning of the motors 24 underneath same and yet allow the rear edging of the riding platform 41 to be as low as possible relative to the ground to provide for ease of step up and step down of the vehicle passengers to and from the ground and to and from the riding position 2 indicated in FIG. 1. Platform 41 may be formed from a suitable metal or fiberglass, and be suitably connected to frame 5 with its slot 41a centered along the vehicle longitudinal center 17 to receive lever 44.

As has also been indicated, a basic feature of the self propelled vehicle of the present invention is concerned with the arrangement for permitting the vehicle to be used not only for riding, but also for carrying of the golf bags, and still be self propelled and led by the golfer holding the vehicle golf bag tote cart fashion (undriven) for full control of the vehicle by the vehicle operator as he walks toward his ball as it may lay on or near the fairway, which represents the next playing position of his ball. For this purpose the vehicle 4 includes the auxiliary control arm or tetherboom 10 which is provided to allow a golfer at the position of the operator 8 of FIG. 1 to walk in front of the vehicle 4 rather than ride the vehicle 4 at one of the positions of the operator 2 of FIG. 1, if the golfer involved so desires. The auxiliary control arm or tetherboom 10 is pivotally mounted on the steering post 58a in the manner indicated in FIG. 3 at axis, by a suitable cross pin arrangement or the like that pivots the control arm 10 to the steering post 58a, both for pivoting of the control arm 10 in a vertical plane between the approximate positions indicated in FIG. 1 about a more or less horizontal axis coincident with the axis 60 that thus extends crosswise of the steering post 58. When the auxiliary control arm or tetherboom 10 is in the upright position of FIGS. 1-3, the control lever 10 control functions over the drive of the vehicle 4 are inoperable, and the vehicle is to be driven by a golfer 2 riding on same, as indicated in FIG. 1, and operating with his foot the control lever 44, as has already been described.

When the auxiliary control arm or tetherboom 10 is to be employed to control the propelling of the vehicle 4, the arm or tetherboom 10 is swung from the inoperable upright position to the operable more or less horizontal position of FIG. 1, which brings into operation the switching arrangement diagrammatically illustrated in FIG. 4. Thus, the forward positioning of the control arm 10, as illustrated in FIG. 1, brings the arm 10 away from the normally open switch 62 (see FIG. 3) which is incorporated in circuitry to open switches 55 and 57 for controlling the drive of the vehicle using arm 10. As indicated in FIG. 4, the arm 10 comprises an inner rod 68 in telescoping relation with an outer tube 70, with the inner rod 68 having an elongated portion 90 of reduced or narrowed thickness inwardly of its outwardly extending portion 92. The relation between the switch 66 and the telescoping rod outer portion 92 is such that the switch arm 94 of switch 66 holds the switch 66 in its normally open position until the telescoping rod portion 92 is drawn outwardly of the outer tube portion to the extent that the switch arm 94 of switch 66 rides on the reduced section portion 90 of rod 68, as indicated in FIG. 4. This draw out action on the rod 68 occurs as the golfer 8, while holding onto the outwardly projecting end 96 of the rod 68, starts to move away from the vehicle 4, as in the direction of his ball. Further, as the arm 10 is lowered to the near or approximate horizontal operating relation shown in FIG. 1, it exerts a pulling action on the cable 64 attached to its bell crank lever end 98, as shown in FIG. 3, to pull the control lever 44 forwardly to its drive initiating position. As indicated in FIG. 3, the cable 64 is trained about pulley or sheave 63 and extends rearwardly of the vehicle to attach at its other end on the stud 54 (see FIG. 5) that is fixed with respect to the control lever 44 for effecting a pulling action on the lever 44 therethrough whereby the lever 44 is positioned to dispose the motor saddles sufficiently below the motors 24 whereby the respective pulleys or sheaves 26 are in full driving relation with the respective belts 28.

Thereafter, the person having the position of the operator 8 of FIG. 1 steers the vehicle 4 by moving the control arm or tetherboom 10 to either side as needed to steer the vehicle and leads the vehicle forwardly, the connection of the arm 10 at the pivot axis 60 permitting the swinging action of the arm 10 from side to side to correspondingly pivot post 58 so as to position wheel 7 for steering the vehicle 4 as needed. With the auxiliary control arm or tetherboom 10 disposed as indicated in FIGS. 1 and 4, switch 66 is in its closed relation to have the motors 24 in their low speed, 6 volt mode. Should the vehicle 4 advance on the operator 8 due to the fact that the operator 8 is moving slower than the vehicle, the thicker outwardly projecting portion 92 of the rod 68 comes into engagement with the switch arm 94 which opens the switch 66 to discontinue the power to the motors 24. The operator in continuing to move forwardly then draws the rod 68 outwardly of the tube 70 until the switch 66 is again closed in the manner previously indicated, whereby the vehicle 4 is again powered to move forwardly. Thus, without any conscious effort by the operator 8, the driving power of the vehicle is turned off and on to keep pace with the operator 8 as needed.

Preferably, the telescoping rod 68 is proportioned to provide at least somewhat in excess of one foot of overshoot of telescoping action on either side of the switch 66 activation location, to prevent the vehicle 4 from pushing or pulling on the arm of the golfer serving as the operator 8 in the showing of FIG. 1, or requiring the attention of the golfer.

The auxiliary control arm or tetherboom also includes one way acting detent stop spring 67 which serves to prevent the rod 68 from being pulled out of the tube 70, by way of engagement of the enlarged stud end 100 of the rod 68 with the stop spring 67. A suitable coil spring 65 that is located externally of the control arm or tetherboom 10 and.is connected between its bell crank end 98 and the vehicle frame 5, in the manner indicated in FIG. 3, biases the control arm 10 for movement to the substantially vertical position illustrated when the arm 10 is released from the operator's grasp, where it is spring biased retained by the tension spring 65 in what amounts to its inoperable stored relation or position.

Another feature of the vehicle 4 that is provided for in accordance with the present invention is that the vehicle 4 is arranged to be easily and quickly connected to the rear of the golfer's automobile for trailing of same on the highway to move the vehicle 4 between a point of storage and point of use or vice versa. For this purpose, the vehicle 4 is provided with a hook 18 suitably fixed to the frame floor 5a, adjacent each of the rear wheels 20, which hooks 18 are positioned with respect to the frame 5 so that they open downwardly (see FIGS. 1-3 and 8). The relation shown in FIGS. 2 and 3 is preferred for the normal driving operation of the vehicle 4, in which position the hooks 18 are disposed vertically (so as to open downwardly); hooks 18 are thus positioned for application to similarly spaced apart loops 14 affixed to the automobile rear bumper 16 as suggested in FIG. 8, it being intended that the respective hooks 18 are to fit into the respective loops 14 and be anchored by their fixed connections to frame 5 to serve as a towing connection to automobile 12 through loops 14. This connection may be effected by backing the vehicle 4 up to the automobile 12 rear bumper 16 in such a manner that the respective hooks 18 are approximately aligned with and below the respective loops 14. The cross bar 21 may be then shifted sideways to lift up one of the rear corners of the vehicle 4 so as to apply the hook 18 at that location on the vehicle, on the loop 14 it is to engage, after which the vehicle 4 is tilted in the other direction employing cross bar 21 in a similar manner to apply the other hook 18 to the other automobile mounted loop 14, whereby the vehicle 4 is mounted in towing relation with the automobile 12 that is indicated in FIG. 8, with the front wheel 7 riding on the roadway involved.

Vehicle 4 is arranged to lock the front wheel 7 aligned with the vehicle longitudinal midportion 17, and for this purpose journalling device 9 is arranged to removably receive cross pin 82 that passes through journalling device 9 and steering post 58a to lock the front wheel in straight forward relation for towing. Pin 82 is removed from journalling device 9 to permit free swivelling of front wheel 7, for normal use of vehicle 4. In this position, the vehicle 4 may be towed by the user of same, as from the user's home and storage place of the vehicle 4, and the user's golf course, or vice versa, after which the vehicle 4 is removed from securement to the automobile 12 by reversing the procedure of attaching the hooks 18 to the respective loops 14.

Figure 9:
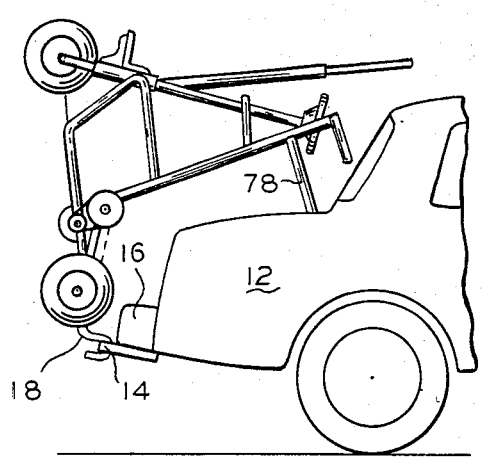
FIG. 9 is a view similar to that of FIG. 8, but showing the cart positioned to be carried by the automobile on top of the automobile rear end with all the cart wheels off the road.

Another way of carrying the vehicle 4 on the rear end of the automobile 12 is illustrated in FIG. 9 which contemplates that a suitable attachment bracket 78 be mounted on the rear of the vehicle 12 that is adapted to clip to the back edge of the vehicle's trunk closure lid in a conventional manner and have a horizontal cross bar at the upper end of same against which the upper portion of the frame 5 of the vehicle at the rearward side thereof, may be rested, as indicated in FIG. 9, and tied in place with rope or the like.

The application of the vehicle 4 to the automobile 12 in the manner illustrated in FIG. 9 presupposes that the rear end of the vehicle 4 has been applied to the loops 14 of the automobile 12 in the manner previously indicated.

As illustrated in FIGS. 1–3, the frame structure 69 is preferably formed to define a front seat 72, consisting of seat portion 73 and back portion 71, for a golfer to sit while awaiting his turn to engage in the golf ball hitting procedure when the vehicle is used on a golf course in the manner indicated. It is a feature of the invention that the seat 72 also doubles as a front fender for the vehicle 4.

The vehicle 4 has special suitability for use by golfers on golf courses to carry golf bags, which as indicated in FIGS. 1–3, may be placed on the vehicle at its forward end, with golf bag positions being defined on the under side of the steering hand wheel 6 by the lower forwardly extending frame members 15 at the bottom of each bag position, and the U shaped bag rests 13 that are suitably anchored to the frame at a position below the respective handles 22. Thus, the vehicle 4 may be used by a sole player to both carry his bag at one of the golf bag carrying positions indicated and serve to transport the golfer when he assumes the operating position 2, or to serve merely as a driven golf bag transporter lead by the golfer when the golfer assumes the operating position 8 of FIG. 1.

However, it is to be understood that the general arrangement of the self propelled vehicle herein disclosed is adaptable for use as a vehicle for other than golf course use, where light cargo is to be transported over a short distance under the guidance of an operator that rides the vehicle in the manner indicated in FIG. 1, or under the lead of an individual serving as the operator 8 of FIG. 1, and for this purpose the frame 5 may be provided with suitable light cargo carrying platforming over the location of the battery or batteries 23, 23a in addition to or instead of components 13 and 15.

While batteries 23 and 23a may be in the form of the standard storage battery type commonly used in automotive vehicles, electric vehicles of the type represented by vehicle 4 are better powered by similarly designed commercially available golf cart oriented, six volt batteries, which have the highest amperes per hour capacity, or commercially available twelve volt marine type batteries (also called "deep cycle" batteries) which also have high apere-hour capacity.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A self propelled vehicle for use as a golf cart or the like for person and light load carrying purposes, said vehicle comprising:

a frame comprising a floor section journalling a pair of drive wheels at the rear of the vehicle that are rotatable about a common axis extending transversely of the vehicle, said wheels being spaced apart to either side of the vehicle, a riding platform having forward and rear ends carried by said frame floor section between said drive wheels and disposed at a level adjacent said common axis with said rear end thereof being open for person mounting of same from the rear of the vehicle, said frame further comprising a forwardly extending section, a steerable front wheel mounted on said frame forwardly extending section, said frame further comprising an upright hand hold section projecting upwardly from said floor section thereof adjacent the forward end of said platform and disposed generally transversely of said vehicle, said platform defining right and left hand standing positions for carrying a person in upright position who has mounted said platform from the rear of the vehicle, said frame hand hold section including a hand hold on either side of said vehicle at an elevation about said platform for convenient hand grasping by a person standing on said platform at the respective platform standing positions, said frame journalling a hand wheel adjacent the level of said hand holds, means for coupling said hand wheel to said steerable front wheel for steering said vehicle, electric motor drive means for separately driving said driving wheels including battery means forming the source of electrical energy for driving said motor means, a drive speed control lever mounted for movement longitudinally of said vehicle and located adjacent said platform, and means controlled by said movement of said control lever for controlling said motor drive means to provide a zero, low and high speed driving action on said driven wheels, said control lever projecting above said platform, for foot action, by a person standing at one of said platform positions for transportation by said vehicle, for effecting said control of said controlled means.

2. The vehicle set forth in claim 1 wherein:
said drive means underlies said platform.

3. The vehicle set forth in claim 1 wherein:
said drive means comprises for each of said drive wheels:
a series wound direct current motor,
and wherein said controlled means comprises:
a battery source of direct current connected to said motors and including means optionally switching the voltage supplied to said motors between zero volts, a voltage for low speed operation, and a voltage for high speed operation.

4. The vehicle set forth in claim 3 wherein:
said motor for the respective drive wheels is coupled to the drive wheel it drives by a drive train including at least one endless flexible drive member trained over a pair of drive discs rotatable about parallel axes, with such motor being mounted for pivotal movement about a third axis substantially paralleling said parallel axes and supported against gravity by said drive member for tensioning said drive member,
said controlled means including means for moving said motors about said third axis for optionally providing said zero and low speed driving action on said driven wheels.

5. The vehicle set forth in claim 1 wherein:
said motors are automobile starter type motors,
and said optional switching means comprises automotive starter solenoid switches.

6. The vehicle set forth in claim 1 wherein:
said control lever comprises:
an upright rod portion that is made fast to an actuator bar extending transversely of said vehicle adjacent said drive wheels and journalled on said frame for pivotal movement forwardly and rearwardly of said vehicle,
said controlled means including switch, clutch, and braking means actuated by said actuator bar on said movement of said control lever to provide said speed driving actions on said driven wheels and braking thereof.

7. The vehicle set forth in claim 1 wherein:
said electric motor drive means comprises a separate drive motor for driving the respective drive wheels,
said motors being carried by said frame below said platform.

8. The vehicle set forth in claim 1 wherein:
said means for coupling said hand wheel to said steerable front wheel includes a steering post,
and including an auxiliary control arm pivotally mounted on said post, adjacent one end of said arm, for pivotal movement about a generally horizontal axis that extends transversely of said post,
means for spring biasing said arm to an upright position for disposing the other end of same above said horizontal pivot axis thereof,
with said other end of said arm serving as a handle to be grasped by a pedestrian at the front of said vehicle for swinging said arm forwardly of said vehicle about said horizontal axis in opposition to said spring bias for enabling the pedestrian to lead said vehicle,
and connector means extending between said arm and said control lever for pulling said drive lever into driving action position when said arm is moved to said pedestrian leading position.

9. The vehicle set forth in claim 8 wherein:
said arm comprises an outer tubular member at said one end of same and a rod member at said other end of same that is telescopingly received in said tubular member,
said arm members including means for controlling said electric motor drive means to the exclusion of said control lever when said arm is in its pedestrian leading position for maintaining said driving action to keep pace with the pedestrian.

10. The vehicle set forth in claim 1 wherein:
said frame at the rear ends of same includes connector means for making a towing connection to an automobile.

11. The vehicle set forth in claim 1 wherein:
said frame at the front end of same carries a low level front seat facing forwardly that overlies said steerable wheel,
said frame being formed to mount a light load on said between said seat and said upright hand hold section.

12. A self propelled vehicle for use as a golf cart or the like for person and light load carrying purposes, said vehicle comprising:
a frame comprising a floor section journalling a pair of drive wheels at the rear of the vehicle that are rotatable about a common axis extending transversely of the vehicle,
said wheels being spaced apart to either side of the vehicle,
a riding platform having forward and rear ends carried by said frame floor section between said drive wheels and disposed at a level adjacent said common axis with said rear end thereof being open for person mounting of same from the rear of the vehicle,
said frame further comprising a forwardly extending section,
a steerable front wheel mounted on said frame forwardly extending section,
with said wheels being in tricycle orientation relation,
said frame further comprising an upright hand hold section projecting upwardly from said floor section thereof adjacent the forward end of said platform and disposed generally transversely of said vehicle,
said vehicle defining a longitudinally extending midportion, in alignment with which said front wheel is mounted, and which substantially bisects the spacing between said drive wheels, with said vehicle midportion forming said platform into right and left hand standing positions for carrying a person in upright position who has mounted said platform from the rear of the vehicle,
said frame hand hold section including a hand hold on either side of said vehicle longitudinally extending midportion at an elevation above said platform for convenient hand grasping by a person standing on said platform at the respective platform standing positions,
said frame journalling a hand wheel adjacent the level of said hand holds and that is centered on said vehicle midportion,
means for coupling said hand wheel to said steerable front wheel for steering said vehicle,
electric motor drive means for separately driving said driving wheels including battery means forming the source of electrical energy for driving said motor means, a drive speed control lever mounted at and for movement along said vehicle longitudinally extending midportion, and means controlled by said movement of said control lever longitudinally of said vehicle midportion for controlling said motor drive means to provide a zero, low and high speed driving action on said driven wheels, said control lever being disposed between said standing positions of said platform and projecting above said platform, for foot action by a person standing at one of said platform positions for transportation by said vehicle, for effecting said control of said control means.

13. The vehicle set forth in claim 12 wherein:

said means for coupling said hand wheel to said steerable front wheel includes a steering post aligned with said vehicle midportion, and including an auxiliary control arm pivotally mounted on said post, adjacent one end of said arm, for pivotal movement about a generally horizontal axis that extends transversely of said post, means for spring biasing said arm to an upright position for disposing the other end of said above said horizontal pivot axis thereof, with said other end of said arm serving as a handle to be grasped by a pedestrian at the front of said vehicle for swinging said arm forwardly of said vehicle about said horizontal axis in opposition to said spring bias for enabling the pedestrian to lead said vehicle, and connector means extending between said arm and said control lever for pulling said drive lever into driving action position when said arm is moved to said pedestrian leading position.

14. The vehicle set forth in claim 12 wherein:

said arm comprises an outer tubular member at said one end of same and a rod member at said other end of same that is telescopingly received in said tubular member, said arm members including means for controlling said electric motor drive means to the exclusion of said control lever when said arm is in its pedestrian leading position for maintaining said driving action to keep pace with the pedestrian.

15. The vehicle set forth in claim 12 wherein:

said electric motor drive means for each of said drive wheels comprises a series wound direct current motor, a battery source of direct current connected to said motor and including solenoid switch means optionally switching the voltage supplied to said motor between zero volts, a voltage for low speed operation, and a voltage for high speed operation, said optional switching means comprising said means controlled by said movement of said control lever.

* * * * *